(12) United States Patent
Matsuhisa et al.

(10) Patent No.: US 11,107,601 B2
(45) Date of Patent: Aug. 31, 2021

(54) ELASTIC CONDUCTOR, PASTE FOR FORMING ELASTIC CONDUCTOR, AND METHOD FOR PRODUCING ELASTIC CONDUCTOR

(71) Applicant: Japan Science and Technology Agency, Kawaguchi (JP)

(72) Inventors: Naoji Matsuhisa, Mountain View, CA (US); Takao Someya, Tokyo (JP); Daishi Inoue, Wako (JP)

(73) Assignee: Japan Science and Technology Agency, Saitama (JP)

(*) Notice: Subject to any disclaimer, the term of this patent is extended or adjusted under 35 U.S.C. 154(b) by 58 days.

(21) Appl. No.: 16/468,236

(22) PCT Filed: Dec. 14, 2017

(86) PCT No.: PCT/JP2017/044850
§ 371 (c)(1),
(2) Date: Jun. 10, 2019

(87) PCT Pub. No.: WO2018/110632
PCT Pub. Date: Jun. 21, 2018

(65) Prior Publication Data
US 2020/0082957 A1    Mar. 12, 2020

(30) Foreign Application Priority Data

Dec. 14, 2016    (JP) .............................. JP2016-242459

(51) Int. Cl.
*H01B 1/24*    (2006.01)
*C08K 3/04*    (2006.01)
(Continued)

(52) U.S. Cl.
CPC ............... *H01B 1/24* (2013.01); *C08K 3/041* (2017.05); *C08K 3/08* (2013.01); *C08K 7/00* (2013.01);
(Continued)

(58) Field of Classification Search
CPC .......... C08L 27/16; C08L 21/00; C08L 75/04; C08K 3/08; C08K 7/00; C08K 2003/0806;
(Continued)

(56) References Cited

U.S. PATENT DOCUMENTS

2003/0122257 A1    7/2003    Onami et al.
2015/0129276 A1*    5/2015    Shumaker ................ H01B 3/28
174/69

(Continued)

FOREIGN PATENT DOCUMENTS

CN    1395259 A    2/2003
CN    105940461 A    9/2016
(Continued)

OTHER PUBLICATIONS

"Multi-Walled Carbon Nanotubes: Production, Analysis, and Application," https://www.azonano.com/article.aspx?ArticleID=3469, May 24, 2013) (Year: 2013).*

(Continued)

*Primary Examiner* — Mark Kopec
*Assistant Examiner* — Jaison P Thomas
(74) *Attorney, Agent, or Firm* — Christensen O'Connor Johnson Kindness PLLC (57) ABSTRACT

The invention provides an elastic conductor which is excellent in stretchability and hardly causes a decrease in conductivity even when stretched. The elastic conductor includes an elastomer and two types of conductive particles, wherein the two types of conductive particles are flake-like
(Continued)

particles and nanoparticles, and the conductive particles are dispersed throughout the elastomer.

17 Claims, 5 Drawing Sheets

(51) Int. Cl.
- *C08K 3/08* (2006.01)
- *C08K 7/00* (2006.01)
- *C08L 21/00* (2006.01)
- *C08L 75/04* (2006.01)
- *C09D 115/00* (2006.01)
- *H01B 1/22* (2006.01)
- *H01B 13/00* (2006.01)

(52) U.S. Cl.
CPC .............. *C08L 21/00* (2013.01); *C08L 75/04* (2013.01); *C09D 115/00* (2013.01); *H01B 1/22* (2013.01); *H01B 13/0036* (2013.01); *C08K 2003/0806* (2013.01)

(58) Field of Classification Search
CPC ........ C08K 2201/001; C08K 2201/003; C08K 2201/011; C08K 2201/016; C08K 3/041; C09D 115/00; H01B 13/0036; H01B 1/00; H01B 1/22; H01B 1/24; H01B 7/06
See application file for complete search history.

(56) References Cited

U.S. PATENT DOCUMENTS

| | | |
|---|---|---|
| 2016/0372230 A1 | 12/2016 | Imahashi |
| 2017/0169914 A1 | 6/2017 | Sekitani et al. |

FOREIGN PATENT DOCUMENTS

| | | | |
|---|---|---|---|
| JP | 2010-153364 A | | 7/2010 |
| JP | 5486268 B2 | * | 5/2014 |
| JP | 2015-079725 A | | 4/2015 |
| WO | 2015/005204 A1 | | 1/2015 |
| WO | 2015/119217 A1 | | 8/2015 |
| WO | WO-2015119217 A1 | * | 8/2015 ......... H01L 51/0022 |

OTHER PUBLICATIONS

Office Action dated Apr. 3, 2020, issued in corresponding Chinese Application No. 201780076740.5, filed Dec. 14, 2017, 16 pages.
International Search Report dated Feb. 13, 2018, issued in corresponding International Application No. PCT/JP2017/044850, filed Dec. 14, 2017, 4 pages.

* cited by examiner

ELASTIC CONDUCTOR, PASTE FOR FORMING ELASTIC CONDUCTOR, AND METHOD FOR PRODUCING ELASTIC CONDUCTOR

TECHNICAL FIELD

The present invention relates to an elastic conductor, a paste for forming an elastic conductor, and a method of producing the elastic conductor.

Priority is claimed on Japanese Patent Application No. 2016-242459, filed in Japan on Dec. 14, 2016, the content of which is incorporated herein by reference.

BACKGROUND ART

Flexible electronics are techniques for realizing mechanical flexibility in electronic devices, and have attracted great attention in recent years. In particular, flexible electronics are believed to bring important value to large area electronic devices such as displays, solar cells, sensors, actuators or the like.

For example, the larger the electronic devices are, the more flexible the electronic devices require for portability and impact resistance. The difficulty in realizing flexibility in electronic devices is how to achieve both excellent electrical and mechanical properties on plastic films.

The stretchability of an electronic device is considered to be a function which is necessary for the electronic device to be incorporated into a structure or a living body that deforms with movement or load. In order to realize flexibility in electronic devices, it is necessary to have a configuration in which active circuits such as transistors constituting the device, and passive circuits such as resistors and capacitors are not damaged as the device is deformed. It is also necessary to have a configuration in which the characteristics do not change as the device is deformed. Elastic conductors which are suitable for configuring circuits of such stretchable devices have, been developed.

Patent Document 1 discloses an elastic conductor including an elastic portion made of an elastomer Obtained by mixing a surfactant and conductive particles dispersed in the elastic portion, and a conductive portion in which the conductive particles are densely assembled on a surface layer side of the elastic portion.

Patent Document 1: WO 2015/119217

SUMMARY OF THE INVENTION

The elastic conductor described in Patent Document 1 includes a fluororubber and conductive particles, and is obtained by optimizing an aqueous mixture to which a fluorosurfactant is added, so that the conductive particles are more densely assembled on the surface side of the elastic conductor than on the inner portion. The obtained elastic conductor has excellent stretchability and conductivity. However, depending on the field of application, there is a need in the art for elastic conductors in which the conductive particles are uniformly dispersed and which have similar properties.

The present invention has been made in view of the above circumstances, and it is an object of the present invention to provide an elastic conductor which has a high degree of stretchability and has a small decrease in conductivity even when stretched, as well as a paste for forming an elastic conductor and a method of producing the same.

In order to achieve the above object, the present invention adopts the following configuration.

[1] An elastic conductor comprising: an elastomer, two types of conductive particles, wherein the two types of conductive particles are flake-like particles and nanoparticles, and the nanoparticles are dispersed throughout the elastomer.

[2] The elastic conductor according to [1], wherein the conductive particles are dispersed throughout the elastomer.

[3] The elastic conductor according to [1] or [2], wherein the elastomer is a fluororubber.

[4] The elastic conductor according to any one of [1] to [3], wherein the flake-like particles have a particle diameter, of 0.2 to 50 μm, and the nanoparticles have a particle diameter of 0.5 to 100 nm.

[5] The elastic conductor according to any one of [1] to [4], wherein an aspect ratio (a ratio of a long axis to a thickness) of the flake-like particles is 2 to 100.

[6] The elastic conductor according to any one of [1] to [5], wherein a mass composition ratio of the elastomer is 10% to 50% by mass with respect to the elastic conductor, and a mass composition ratio of the conductive particles is 50% to 90% by mass With respect to the elastic conductor.

[7] The elastic conductor according to any one of [1] to [6], further comprising a surfactant.

[8] The elastic conductor according to [7], wherein the surfactant is a fluorosurfactant.

[9] The elastic conductor according to any one of [1] to [8], wherein the elastic conductor has an electrical conductivity of 200 S/cm or more.

[10] A paste for forming elastic conductor, comprising an elastomer, at least two types of conductive particles, and an organic solvent, wherein the two types of conductive particles are flake-like particles and nanoparticles.

[11] The paste for forming an elastic conductor according to [10], wherein the elastomer is a fluororubber.

[12] The paste for forming an elastic conductor according to [10] or [11], wherein the flake-like particles have a particle diameter of 0.2 μm, to 50 μm, and the nanoparticles have a particle diameter of 0.5 nm to 100 nm.

[13] The paste for forming an elastic conductor according to any one of [10] to [12], wherein an aspect ratio (a ratio of a long axis to a thickness) of the flake-like particles is 2 to 100.

[14] The paste for forming an elastic conductor according to any one of [10] to [13], further comprising a surfactant.

[15] The paste for forming elastic conductor according to [14], wherein the surfactant is a fluorosurfactant.

[16] The paste for forming elastic conductor according to any one of [10] to [15], wherein a mass composition ratio of the elastomer is 10% to 50% by mass with respect to the non-volatile component of the paste for forming an elastic conductor, and a mass composition ratio of the conductive particles is 50% to 90% by mass with respect to the non-volatile component of the paste for forming an elastic conductor.

[17] An elastic conductor obtained by drying the paste for forming elastic conductor according to any one of [10] to [16].

[18] A method for producing an elastic conductor, wherein the elastic conductor comprises an elastomer and two types of conductive particles; the two types of conductive particles are flake-like particles and nanoparticles; and the nanoparticles are dispersed throughout the elastomer, the method comprising: mixing and stirring the elastomer, the flake-like particles and an organic solvent.

[19] The method for producing an elastic conductor according to [18], wherein the conductive particles are dispersed throughout the elastomer.

According to the present invention, even when nanoparticles or conductive particles are uniformly dispersed in a conductor, it is possible to provide an elastic conductor having excellent conductivity while having stretchability.

The present invention can provide an elastic conductor suitable for forming a circuit of a stretchable device necessary for an electronic device incorporated into a structure or a living body, each of which is deformed with movement or load.

In particular, in one embodiment of the present invention, by optimizing the blending amount of each component of the elastic conductor, it is possible to provide an elastic conductor with excellent properties exceeding 200 S/cm, even when stretched at around 300% while uniformly dispersing the conductive particles.

DETAILED DESCRIPTION OF THE INVENTION

The elastic conductor, the paste for forming an elastic conductor, and the method for producing an elastic conductor using the paste for forming elastic conductor to which the present invention is applied will be described in detail below.

Note that the drawings used in the following description show a part of typical cases in order to make features easy to understand, and do not limit the scope of the invention. In addition, the materials, dimensions and the like exemplified in the following description are merely examples, and the present invention is not limited to them, and can be appropriately changed and implemented without changing the gist of the invention.

(Elastic Conductor)

The elastic conductor of the present invention includes elastomer and two types of conductive particles. The two types of conductive particles are flake-like particles and nanoparticles, characterized in that the nanoparticles are dispersed throughout the elastomer. Preferably, the conductive particles are dispersed throughout the elastomer.

<Elastomer>

The elastomer contained in the elastic conductor of the present invention may be selected from crosslinked rubbers and thermoplastic elastomers. For example, urethane rubber, silicone rubber, fluororubber, acrylic rubber, acrylonitrile butadiene rubber, styrenes, olefins, vinyl chlorides, polyesters, polyurethanes, polyamides or the like can be mentioned. From the viewpoint of stretchability, chemical stability, compoundability with conductive particles and the like, the elastomer is preferably fluororubber. The fluororubber is an elastomer having a fluorine atom in the molecule. For example, a copolymer of ethylene trifluoride chloride and vinylidene fluoride may be used.

As the fluororubber, a binary material composed of vinylidene fluoride (VDF) and hexafluoropropylene (HFP) or a ternary material composed of vinylidene fluoride (VDF), tetrafluoroethylene (TFE), and hexafluoropropylene (HFP) can be preferably used. The binary or ternary material is particularly suitable for the present invention because it has high chemical stability among fluororubbers.

Specific examples of the fluororubber include binary fluororubbers such as G8002L, G8002, G802, G801, G8001 or the like, each of which is manufactured by Daikin Industries, Ltd.; and ternary fluororubbers such as G603BP, G621BP, G901, G912, LT-302, LT-303L, LT-304, GBR-6002, GBRX or the like, each of which is Manufactured by Daikin Industries, Ltd. may be used.

<Conductive Particle>

The conductive particles contained in the elastic conductor of the present invention include at least flake-like particles and nanoparticles. Examples of the materials of the conductive particles include metallic gold, metallic platinum, metallic silver, metallic copper, carbon and the like. The material of the flake-like particles and the nanoparticles may be the same or different. Of all the known metals, pure silver has the highest conductivity, so it is preferred that the conductive particles be metallic silver particles. The "metallic silver particles (silver particles, silver flakes (described later), silver nanoparticles (described later))" may be substantially made of a pure silver, which is, for example, a metal containing at least 95% by mass of silver; or in other examples, a metal containing at least 97% by mass or at least 98% by mass of silver. For example, the metallic silver particles may contain silver and at least one additional metal selected from the group consisting of Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sin, Eu, Th, Mg, Ca, Sr, and Ba. Examples of combinations of flake-like particles and nanoparticles include flake-like particles made of metallic silver and nanoparticles made of metallic silver, flake-like particles made of metallic silver and nanoparticles made of metallic gold, flake-like particles made of metallic silver and nanoparticles made of carbon, flake-like particles made of graphite and nanoparticles made of metallic silver, and flake-like particles made of graphite and nanoparticles made of carbon.

<Flake-Like Particles>

Flake-like particles are particles that are in the form of thin pieces or flakes.

As flake-like electrically-conductive particles to be preferably used, various commercial products may be used. For example, "Silver Flakes" (product number 327077-50G, size 10 μm, purity 99.9%) manufactured by Sigma Aldrich Company is available.

The average particle diameter of the flake-like conductive particles is preferably 0.2 μm to 50 μm, more preferably 1 μm to 30 μm, and still more preferably 2 μm to 20 μm. The average particle diameter may be defined as, for example, a number-average particle diameter measured by dispersing the flake-like conductive particles in a non-dissolving medium and then measuring the particles using a laser scattering particle, diameter distribution analyzer (for example, "LA-920" manufactured by HORIBA).

A shape of the conductive particles may be observed by, for example, a scanning electron microscope (SEM). Here, an example of a definition of the shape of the conductive particles will be described.

A longest side of the rectangular parallelepiped having the smallest volume (the circumscribed rectangular parallelepiped) among the rectangular parallelepipeds circumscribing the conductive particles is defined as a long diameter (L), a second longest side is defined as a short diameter (B), and a shortest side is defined as a thickness (T) (B>T). The shape of the conductive particles is defined by an aspect ratio of the long diameter to the thickness (L/T).

The flake-like conductive particles contained in the elastic conductor of the present invention are conductive particles having an aspect ratio (L/T) of 2 to 100.

The long diameter (L) of the flake-like conductive particles is preferably 1 μm to 50 μm, more preferably 2.5 μm to 25 μm, and still more preferably 5 μm to 15 μm.

The aspect ratio (L/T) of the long diameter (L) to the thickness (T) of the flake-like conductive particles is preferably 2 or more, more preferably 4 or more, and still more preferably 6 or more. The thickness (T) of the flake-like conductive particles is, for example, preferably 0.2 μm to 10 μm, more preferably 0.5 μm to 5 μm, and still more preferably 1 μm to 5 μm.

The flake-like conductive particles may be used alone or in combination of two or more kinds of the particles.

<Nanoparticles>

Preferred examples of the nanoparticles contained in the elastic conductor of the present invention are silver nanoparticles. The shape of the nanoparticles can be a conventionally known shape. Examples thereof include a substantially spherical shape, a spheroid shape, a polyhedron shape, a flake-like shape, a disk shape, a fibrous shape, and a needle shape. Further, the term "substantially spherical" includes not only substantially spherical shapes that can be approximated to spherical shapes, but also true spheres.

The average particle diameter of the nanoparticles is preferably 0:5 nm to 100 nm, more preferably 0.5 nm to 50 nm, still more preferably 0.5 nm to 25 nm, and most preferably 0.5 nm to 10 nm.

The average particle diameter of the nanoparticles may be, for example, an average particle diameter measured by using a dynamic light scattering method (DLS), for example, using a scattering particle diameter analyzer (Microtrac Series, manufactured by Nikkiso CO., Ltd.); or an average particle diameter measured by observing a surface or cross-sectional SEM photograph of the elastic conductor.

In the elastic conductor of the present invention, nanoparticles such as silver nanoparticles are dispersed throughout the elastomer such as fluororubber. In the elastic conductor of the present invention, preferably, flake-like particles such as silver flakes are dispersed throughout the elastomer such as fluororubber. The nanoparticles such as silver nanoparticles are not particularly limited as long as they can be dispersed in the fluororubber between the silver flake particles and stably exist.

The nanoparticles contained in the elastic conductor of the present invention may be derived from flake-like particles in the process of producing the elastic conductor. In the case of the elastic conductor of an example of the present invention containing silver flakes and silver nanoparticles, the silver nanoparticles may be derived from silver flakes in the process of producing the elastic conductor. When the silver nanoparticles are derived from the silver flakes, the silver nanoparticles are stably dispersed in the elastic conductor of the present invention. And the silver nanoparticles which are usually separated by fluorine rubber can form an electrical conducting path and contribute to the conductivity of the elastic conductor when the elastic conductor is deformed, and for example, it is elongated.

In addition, as the silver nanoparticles contained in the elastic conductor of an example of the present invention, silver nanoparticles used in an application of known silver paint compositions (silver ink, silver paste) may be used. In the case of producing a conventional conductor using a paint composition, for example, there is a step of removing the organic stabilizer on the surface of the silver nanoparticles by low temperature sintering to conduct electrical current between silver nanoparticles. When producing an elastic conductor using such known silver nanoparticles, for example, even if silver nanoparticles coated with an organic stabilizer are present in the elastic conductor, there is no electrical conducting path between the silver nanoparticles, or between the flakes and the silver nanoparticles. As a result, the silver nanoparticles have small contribution to the conductivity of the elastic conductor. Therefore, when using a composition containing silver-nanoparticles stabilized with an organic stabilizer as a raw material, it is preferable that the organic stabilizer is exfoliated at least partly on the surface of the silver nanoparticles dispersed in the elastic conductor.

The conductive particles contained in the elastic conductor of the present invention may contain, in addition to bath of the flake-like particles and the nanoparticles, other conductive particles such as carbon nanotubes and graphene.

<Surfactant>

The elastic conductor of the present invention may further contain a surfactant. The surfactant contained in the elastic conductor of the present invention is not particularly limited as long as the conductive particles can be dispersed throughout the elastomer of the elastic conductor. The surfactant contained in the elastic conductor of the present invention is preferably a water-free surfactant. "Water-free surfactant" is meant a surfactant substantially not containing water. The water content of the water-free surfactant is, for example, preferably 1% or less, more preferably 0.5% or less, and still more preferably 0.1% or less.

Examples of the surfactant contained in the elastic conductor of the present invention include nonionic surfactants, silicone surfactants, fluorosurfactants and the like.

Examples of nonionic surfactants include Neilsen (registered trademark) TDS-30, TDS-70, TDS-120 each of which is manufactured by Daiichi Kogyo Seiyaku Co., Ltd. As silicone surfactants, for example, KF-6048 manufactured by Shin-Etsu Chemical Co., Ltd. may be used. Examples of fluorosurfactants include, for example, S386 manufactured by AGC Seimi Chemical, and FC-4430 and FC-4432 each of which is manufactured by 3M (registered trademark).

These surfactants can be used in combination of two or more types.

An example of a preferred surfactant is a fluorosurfactant. For example, S386 manufactured by AGC Seimi Chemical is preferred.

<Composition of Elastic Conductor>

The mass composition ratio of the elastomer in the elastic conductor of the present invention is preferably 10% to 50% by mass, more preferably 15% to 45% by mass, and even more preferably 20% to 40% by mass with respect to the elastic conductor.

The mass composition ratio of the conductive particles in the elastic conductor of the present invention is preferably 50% to 90% by mass, more preferably 55% to 85% by mass, and even more preferably 60% to 80% by mass with respect to the elastic conductor.

When the elastic conductor contains a surfactant, the mass composition ratio of the surfactant in the elastic conductor of the present invention is preferably 0.1% to 10% by mass, more preferably 0.5% to 6% by mass, and even more preferable 1% to 3% by mass with respect to the elastic conductor.

The amount of conductive nanoparticles contained in the elastic conductor can be evaluated, for example, by photographing the surface or cross section of the elastic conductor with a scanning electron microscope of 300,000 times and evaluating the obtained photograph. In a region not containing conductive flake-like particles; for example, the amount of nanoparticles can be evaluated by calculating an area occupied by nanoparticles in a rectangular range of 200 nm×200 nm, and then calculating an occupancy rate of nanoparticles according the following formula: occupancy rate of nanoparticles=area occupied by nanoparticles/200 nm×200 nm.

The occupancy rate of the nanoparticles is preferably 0.5% to 30%, more preferably 1.0% to 25%, still more preferably 5.0% to 20%, and particularly preferably 10.0% to 15%. When the occupancy rate of the nanoparticles is 0.5% or less, effect on conductivity of the nanoparticles may not be exhibited, and when the occupancy rate of the nanoparticles exceeds 30%, the stretchability of the elastic conductor may be impaired.

<Evaluation of Elastic Conductor>

The elastic conductor of the present invention can be used when the conductivity at an elongation rate of 0% is 10 S/cm or more, or 50 S/cm or more depending on the application. The conductivity at an elongation rate of 0% is preferably 100 S/cm or more, more preferably 200 S/cm or more, and still more preferably 1000 S/cm or more.

The measurement method of the conductivity at each strain (elongation rate, %) can be measured by the measurement method described later.

The elastic conductor of the present invention can be used if the conductivity at an elongation rate of 50% is 100 S/cm or more depending on the application.

The conductivity at an elongation rate of 50% is preferably 100 S/cm or more, more preferably 200 S/cm or more, still more preferably 350 S/cm or more, and most preferably 550 S/cm or more.

The conductivity at an elongation rate of 300% is preferably 100 S/cm or more, more preferably 200 S/cm or more, still more preferably 300 S/cm or more, most preferably 400 S/cm Or more.

(Paste for Forming Elastic Conductor)

The paste for forming an elastic conductor of the present invention contains an elastomer, at least two types of conductive particles, and an organic solvent. The two types of conductive particles are characterized in that they are flake-like particles and nanoparticles. The paste for forming an elastic conductor of the present invention preferably further contains a surfactant.

The elastomer, the conductive particles and the surfactant contained in the paste for forming the elastic conductor of the present invention may be the same as the elastomer, the conductive particles and the surfactant contained in the above-mentioned elastic conductor. Alternatively, the elastomer, the conductive particles and the surfactant contained in the paste for forming an elastic conductor of the present invention may be raw materials which can be changed to the elastomer, the conductive particles, or the surfactant contained in the above-mentioned elastic conductor in the process of drying and curing the paste for forming an elastic conductor of the present invention under a predetermined condition to form the elastic conductor of the present invention. For example, the elastomer contained in the paste for forming an elastic conductor of the present invention may be a precursor, pre-polymer or monomer of the above-mentioned rubber polymer.

<Organic Solvent>

The organic solvent contained in the paste for forming elastic conductor of the present invention is not particularly limited as long as it can dissolve the elastomer. For example, in the case of using a fluororubber as the elastomer, it is possible to use 4-methyl-2-pentanone (methyl isobutyl ketone), ethyl acetate, butyl acetate, hexyl acetate, isophorone or the like as a solvent. From the viewpoint of the workability of printing and drying steps, the solvent of methyl isobutyl ketone is preferred.

The paste for forming an elastic conductor of the present invention preferably be free of water. The term "free of water" means that the paste is substantially not contain water, and may contain a small amount of water as an impurity. The amount of water of the paste for forming elastic conductor of the present invention is preferably 0.5% by mass or less, more preferably 0.1% by mass or less, and still more preferably 500 ppm by mass or less.

When the amount of water contained in the paste for forming an elastic conductor is large, the formed elastic conductor may have poor dispersibility of conductive particles, and excellent conductivity and stretchability may not be obtained.

The mass composition ratio of the elastomer in the paste for forming elastic conductor is preferably 10% to 50% by mass, more preferably 15% to 45% by mass and still more preferably 20% to 40% by mass with respect to the non-volatile component of the paste for forming an elastic conductor.

The mass composition ratio of the conductive particles in the paste for forming an elastic conductor is preferably 50% to 90% by mass, more preferably 55% to 85% by mass still more preferably 60% to 80% by mass with respect to the non-volatile component of the paste for forming an elastic conductor.

When the surfactant is contained, the mass composition ratio of the surfactant in the paste for forming elastic conductor is preferably 0.1% to 10% by mass, more preferably 0.5% to 6% by mass, and still more preferably 1% to 3% by mass with respect to the non-volatile component of the paste for forming elastic conductor.

(Method of Producing Elastic Conductor)

A method of producing an elastic conductor according to an embodiment of the present invention includes a step of producing a paste for forming an elastic conductor by mixing an elastomer, conductive flake-like particles and an organic solvent, and a step of forming an elastic conductor by forming a film of the paste for forming an elastic conductor and drying it. The method for producing an elastic conductor according to the present invention when containing a surfactant includes a step of producing a paste for forming an elastic conductor by mixing an elastomer, conductive particles, a surfactant, and an organic solvent, and a step of forming an elastic conductor by forming a film of the paste for forming an elastic conductor and drying it.

The order of blending the fluororubber, the conductive particles, the surfactant and the organic solvent is not particularly limited as long as the conductive particles can be dispersed. For example, it is preferable to mix the fluororubber with the organic solvent, add the conductive particles, and add the surfactant in this order. For example, at first, the bulk-obtained fluororubber is finely divided into pellets; and next, the pellet-like fluororubber and the conductive material are weighed and then mixed with 4-methyl-2-pentanone solvent which dissolves the fluororubber well. The fluororubber is dissolved by stirring, and at the same time the conductive material is dispersed homogeneously in a solution. Then, a fluorosurfactant is added and the mixture is further mixed to produce a paste for forming an elastic conductor.

Regarding an amount of each component during mixing, for example, an amount of the non-volatile component of the paste for forming an elastic conductor is 80.4% by mass, and an amount of the solvent of 4-methyl-2-pentanone is 19.6% by mass. In addition, an amount of the fluororubber, the silver flake or the fluorosurfactant is 24.4% by mass, 73.2% by mass or 2.4% by mass, respectively, based on the non-volatile components of the paste for forming an elastic conductor.

Using the obtained paste for forming an elastic conductor, an elastic conductive pattern can be formed by a printing method such as screen printing, gravure printing, offset printing, dispenser, or inkjet. Moreover, as a substrate on which the paste for forming an elastic conductor is applied, various materials can be used in accordance with the required degree of stretchability, such as a polymer, a rubber, or a fiber. In addition, after the paste for forming an elastic conductor is applied to the substrate and dried by methods described later, the stretch conductor may be sandwiched between the substrate and a material made of the same or different material as the substrate for the purpose of protecting the elastic conductor and enhancing its durability.

There is no particular limitation on the drying method, and known methods can be used.

Drying conditions depend on the concentration (non-volatile component composition ratio) of the paste for forming an elastic conductor, the boiling point of the organic solvent used, the shape of the elastic conductor to be formed, the amount of the sample to be dried at one time, or the like. For example, a method including a second drying step which is 10 to 70° C. higher than the temperature, of the first drying step may be used. It is preferable that a method including the second drying step which is 30 to 60° C. higher than the temperature of the first drying step is used. The temperature of the first drying step is preferably 30 to 120° C., more preferably 50 to 100° C., or still more preferably 60 to 90° C. The temperature of the second drying step is preferably in the range of 80° C. to 150° C., and more preferably 100 to 140° C. It is preferable that the drying method includes two drying steps which include the first drying step in which the drying temperature is 50 to 100° C. and the drying time is 0.5 to 2 hours, and the second drying step in which the drying temperature is in the range of 100 to 140° C. and the drying time is 0.5 to 2 hours. An example is a method of drying at 80° C. for 1 hour and further drying at 120° C. for 1 hour.

<Structure of Elastic Conductor>

Regarding reasons of obtaining a conductor exhibiting excellent stretchability as described above, the present inventor estimates that the phenomenon described below is acting.

Figure 1:
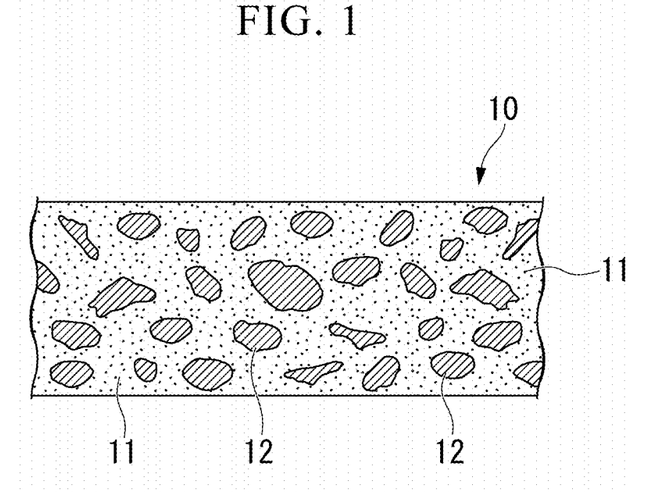
FIG. 1 is a schematic view for explaining an elastic conductor according to an embodiment of the present invention.

In the elastic conductor 10 of the cross-sectional structure shown in FIG. 1, the silver nanoparticles 11 and the silver flakes 12 are dispersed throughout. Silver nanoparticles were observed between the silver flakes, as shown in the cross-sectional photograph of the SEM in FIG. 4 of one embodiment of the present invention. Only silver flakes were added to the paste for forming an elastic conductor without particularly adding silver nanoparticles. The silver nanoparticles are derived from the silver flakes in the step of preparing the paste for forming an elastic conductor or the like. Unlike Patent Document 1, since the paste does not contain water, the silver nanoparticles derived from the silver flakes can be present in a stable dispersion state without aggregation with the silver flakes. The surface of the silver flakes is modified with a surfactant to increase the bonding strength of the interface between the silver flakes and the fluororubber, thereby providing a structure that can withstand large stretching. In addition, when the elastic conductor is stretched, it can be estimated that the nearby silver nanoparticles are aggregated to have an effect of increasing the conducting path.

EXAMPLE

Example 1

With respect to a total amount of 100 parts by mass, 19.6 parts by mass of fluororubber (G8001: trade name of Daikin Industries, Ltd.) used as a raw material, 19.6 parts by mass of 4-methyl-2-pentanone, and 58.8 parts by mass of silver flakes with an average particle diameter of 10 μm ("silver flakes" manufactured by Sigma Aldrich, product number 327077-50G) were mixed. The mixture was stirred and mixed with a magnetic stirrer for 12 hours to obtain an ink-like mixture. Two parts by mass of a fluorosurfactant (S386, manufactured by AGC Seimi Chemical Co., Ltd.) was added to this mixture, and the mixture was stirred and mixed for 12 hours with a magnetic stirrer to obtain a paste for forming an elastic conductor.

The amounts of the paste for forming an elastic conductor are shown in Table 1.

Figure 2:
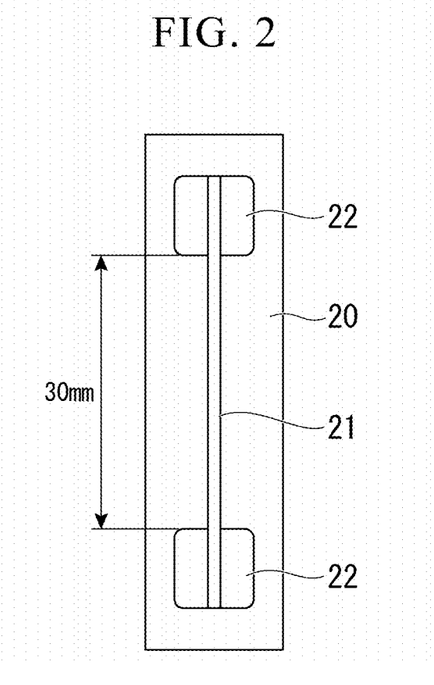
FIG. 2 is an explanatory view of an example of a method for evaluating the elastic conductor obtained in Examples.

A pattern was formed on a polyurethane film with a thickness of 20 μm by screen printing using the paste for forming an elastic conductor, dried at 80° C. for 1 hour, and dried at 120° C. for an additional 1 hour. As a result, an elastic conductor (elastic conductor 21 in FIG. 2) having a length of 3 cm, a width of 500 μm, and a thickness of 20 μm to 30 μm was obtained.

The composition of the elastic conductor is shown in Table 1.

TABLE 1

|  |  |  | Example 1 | Example 2 | Example 3 | Example 4 | Example 5 | Example 6 |
|---|---|---|---|---|---|---|---|---|
| Composition of paste for forming elastic conductor | Elastomer | G8001 | 19.6 | 20 | 24.4 | 27.8 | 19.9 | 16.4 |
| | Conductive particles | Sigma-Aldrich Silver flakes | 58.8 | 60 | 48.8 | 41.62 | 59.7 | 65.6 |
| | Surfactant | S386 | 2 |  | 2.4 | 2.78 | 0.5 | 1.6 |
| | Organic solvent | 4-Methyl-2-pentanone | 19.6 | 20 | 24.4 | 27.8 | 19.9 | 16.4 |
| Composition of elastic conductor | Elastomer | G8001 | 24.4 | 25 | 32.3 | 38.5 | 24.9 | 19.6 |
| | Conductive particles | Sigma-Aldrich Silver flakes | 73.2 | 75 | 64.5 | 57.7 | 74.5 | 78.4 |
| | Surfactant | S386 | 2.4 |  | 3.2 | 3.8 | 0.6 | 2 |
| SEM observation | Presence of silver nanoparticles (Nanoparticle occupancy rate (%)) | | Many (11.4%) | Medium (1.2%) | Many | Many | Medium | Many |
| Elastic conductor evaluation | Elongation rate 0% | Conductivity (S/cm) | 4543 | 3265 | 4089 | 1317.4 | 3633 | 3985 |
| | Elongation rate 50% | Conductivity (S/cm) | 1621 | 1080 | 1734 | 679.9 | 1539.1 | 378.1 |
| | | Stretch failure evaluation | Yes | Yes | Yes | Yes | Yes | Yes |
| | Elongation rate 100% | Conductivity (S/cm) | 1232 | 734.5 | 1212 | 553.7 | 1185 |  |
| | | Stretch failure evaluation | Yes | Yes | Yes | Yes | Yes | No |
| | Elongation rate 150% | Conductivity (S/cm) | 1038 | 558.7 | 953.9 | 491.2 | 990.82 |  |
| | | Stretch failure evaluation | Yes | Yes | Yes | Yes | Yes | No |
| | Elongation rate 200% | Conductivity (S/cm) | 919.4 | 456.7 | 796.8 | 434.5 | 861.6 |  |
| | | Stretch failure evaluation | Yes | Yes | Yes | Yes | Yes | No |
| | Elongation rate 250% | Conductivity (S/cm) | 836.7 | 403 | 730.4 | 0.086 | 774.1 |  |
| | | Stretch failure evaluation | Yes | Yes | Yes | Yes | Yes | No |
| | Elongation rate 300% | Conductivity (S/cm) | 806.06 | 374.1 | 677.9 |  | 749.6 |  |
| | | Stretch failure evaluation | Yes | Yes | Yes | Yes | Yes | No |

<Evaluation of Stretchability and Conductivity of Elastic Conductor>

Conductivity of the test pieces of the produced elastic conductor at each strain state (elongation rate: 0%, 50%, 100%, 100%, 150%, 200%, 250%, or 300%) were measured by using a four-terminal method, while applying extension forces in the longitudinal direction of the strip-like stretchable resin film 20 (speed: 15 mm/min).

In addition to the values of the conductivity at each obtained elongation rate, results whether a conductivity was lost or not are also shown in Table 1, and when the conductivity was not lost, the result is "Yes", and when the conductivity was lost, the result is "No". For example, as shown in Table 1, when a strain of about 300% was applied, a conductivity exceeding 806 S/cm was obtained.

The evaluation results of the elastic conductors are shown in Table 1.

<SEM Observation of Elastic Conductor>

Figure 3:
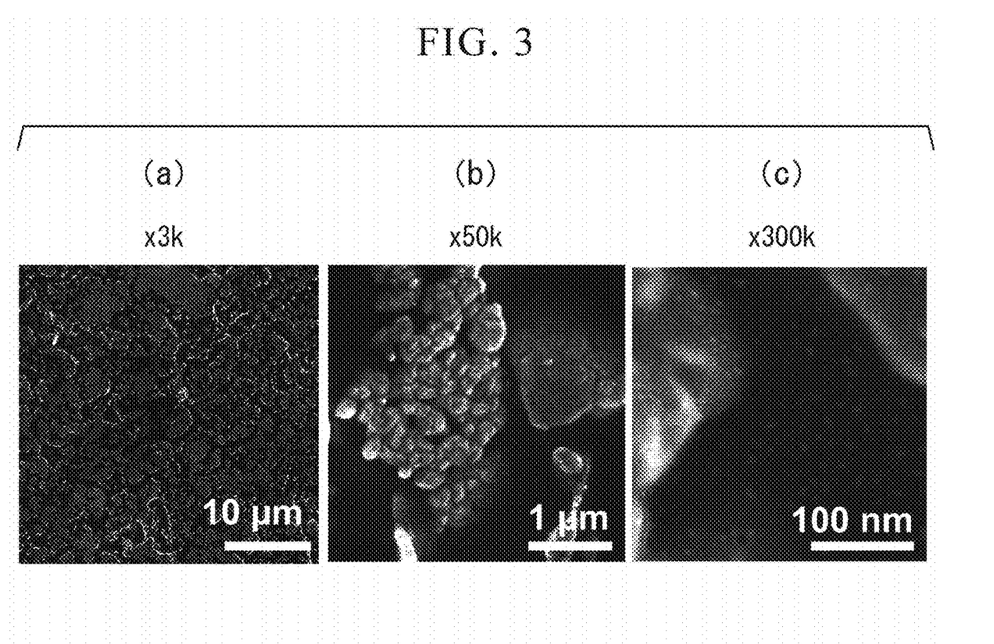
FIG. 3 is a scanning electron micrograph showing the surface state of an elastic conductor sample obtained in an Example.
Figure 4:
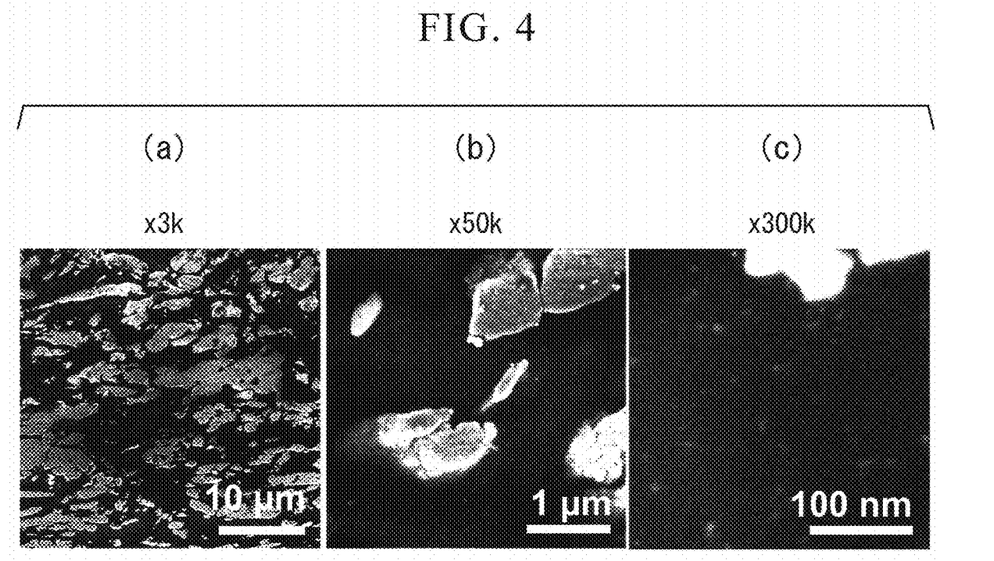
FIG. 4 is a scanning electron micrograph showing the cross-sectional structure of an elastic conductor sample obtained in an Example.

The surface and cross section of the elastic conductor of Example 1 were observed with a scanning electron microscope, and the results are shown in FIGS. 3 and 4, respectively.

In the low-magnification scanning electron micrographs shown in Part (a) of FIG. 3 and Part (a) of FIG. 4, it can be seen that the conductive particles are uniformly dispersed. In addition, silver nanoparticles were observed between silver flakes in the high-magnification scanning electron micrographs shown in Part (c) of FIG. 3 and Part(c) of FIG. 4.

<Measurement of Occupancy Rate of Nanoparticles>

Figure 5:
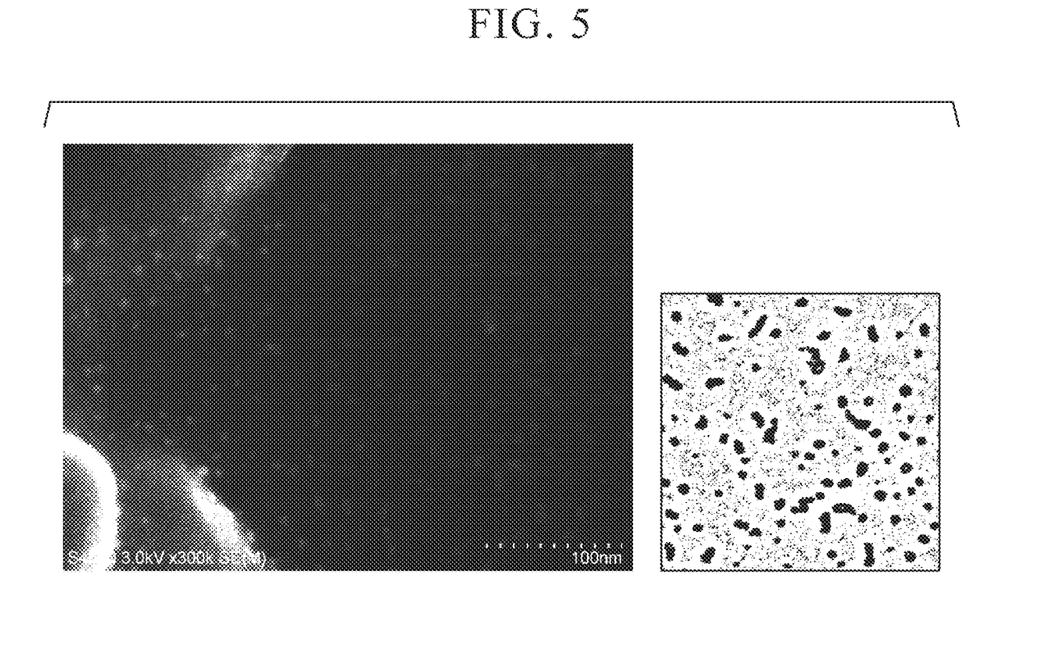
FIG. 5 is a scanning electron micrograph (left) and a view after image processing (right) of the elastic conductor sample obtained in Example 1.

FIG. 5 shows a scanning electron micrograph to be evaluated and data after image processing of part of the scanning electron micrograph.

A method of taking a scanning electron micrograph is shown below:

Scanning Electron Micrograph Device Name: Hitachi S-4800

Measurement condition:
W distance: 5 mm
Acceleration voltage: 3 kV,
Magnification: 300,000 times
Observation location: sample surface Image processing method of scanning electron micrograph:

Software used: Fiji Image J

Processing method: fast Fourier transform (FFT), image binarization,

Processing area: 200 nm×200 nm

Minimum area of counting target nanoparticles: 10 nm$^2$

The analysis results of this example calculated from FIG. 5 are shown in Table 2.

In Table 1, the amount of the nanoparticles as shown in Example 1 was evaluated as "Many". Regarding the other Examples, the amount of the nanoparticles are evaluated as "Medium" or "Few" as the amount decreases. Those without nanoparticles were evaluated as "Nothing".

"Many": occupancy rate of nanoparticles>5%
"Medium": 0.5%<occupancy rate of nanoparticles<5%
"Few": occupancy rate of nanoparticles<0.5%
"Nothing": cannot observe nanoparticles

TABLE 2

|  | Number of nanoparticles | Area occupied by nanoparticles (nm$^2$) | Average area (nm$^2$) | Average particle diameter (nm) | Occupancy rate (%) |
|---|---|---|---|---|---|
| Example 1 | 98 | 4540 | 46 | 8 | 11.4 |
| Example 2 | 4 | 490 | 121 | 12 | 1.2 |
| Example 7 | 14 | 2610 | 186 | 15 | 6.5 |
| Example 17 | 165 | 2590 | 16 | 4 | 6.5 |

Examples 2 to 6

Pastes for forming an elastic conductor were prepared by using the same elastomer, conductive particles, and surfactant as used in Example 1 as components of compositions, and at amounts of compositions of pastes for forming an elastic conductor shown in Table 1. Test pieces of elastic conductors were produced by using the obtained pastes for forming an elastic conductor in the same manner as in Example 1.

Figure 6:
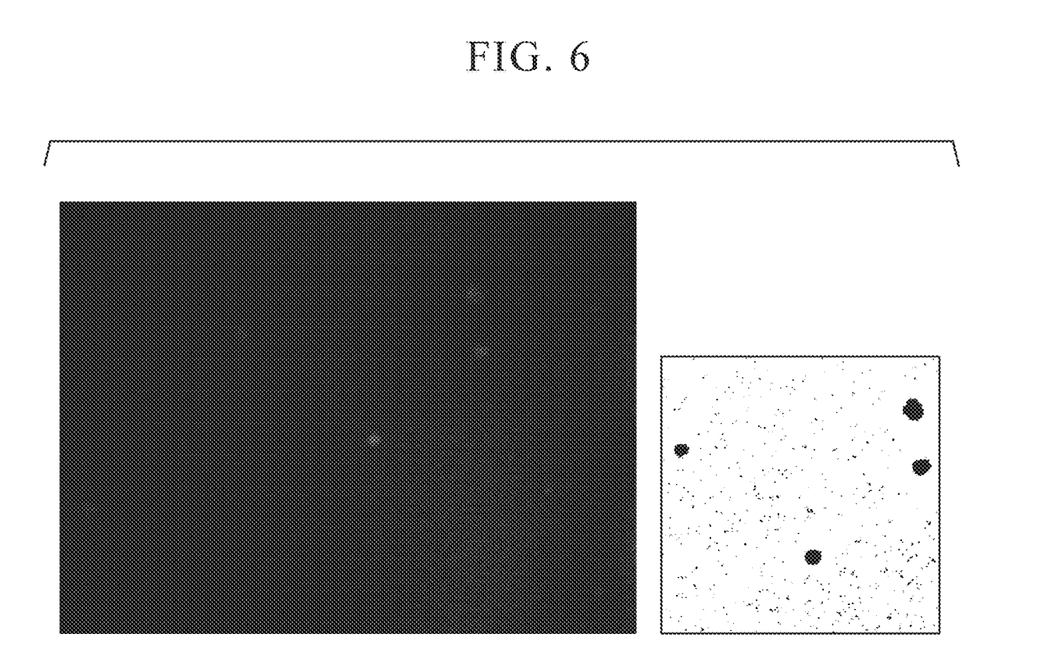
FIG. 6 is a scanning electron micrograph (left) and a view after image processing (right) of the elastic conductor sample obtained in Example 2.

The results of evaluating those test pieces in the same manner as in Example 1 are shown in Tables 1 and 2 and FIG. 6.

Examples 7 to 14

Pastes for forming an elastic conductor were prepared by using the same conductive particles, and surfactant as used in Example 1 as components of compositions, and using elastomers shown in Table 3. Test pieces of elastic conductors were produced by using the obtained pastes for forming an elastic conductor in the same manner as in Example 1. Among these elastomers, G801, G802, G8002L or GBRX (all of which are trade names of Daikin Industries, Ltd.) was used as a fluororubber in place of G8001 of Example 1. In addition, as elastomers other than fluororubbers, Hydran C2000L was used as an epichlorohydrin rubber, Nipol 1042 was used as acrylonitrile butadiene rubber, or Nipol AR 12 was used as an acrylic rubber (all trade names of Nippon Leon Co., Ltd.) in place of G8001 of Example 1.

Figure 7:
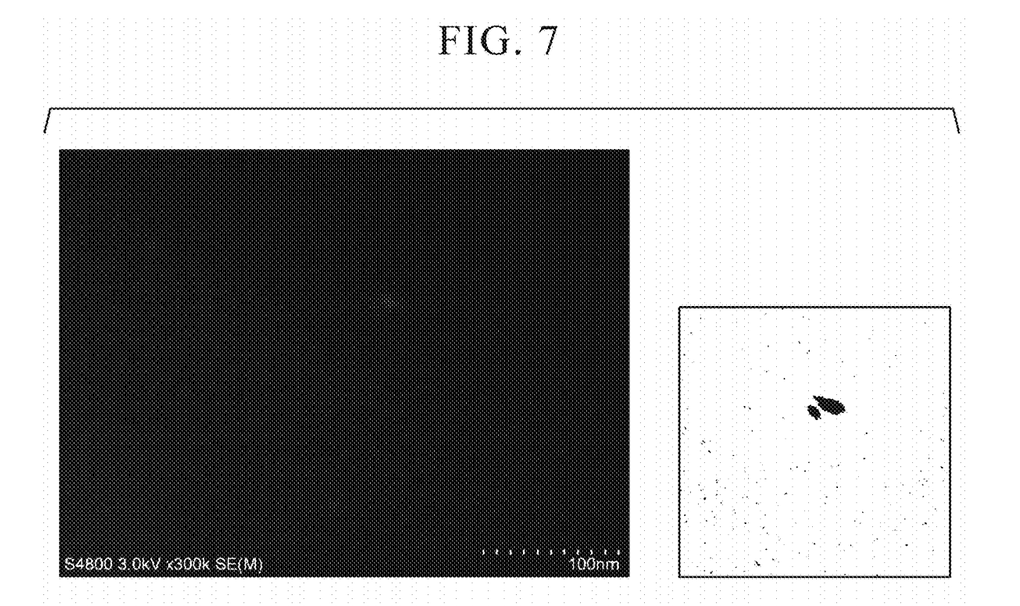
FIG. 7 is a scanning electron micrograph (left) and a view after image processing (right) of the elastic conductor sample obtained in Example 7.

The results of evaluating those test pieces in the same manner as in Example 1 are shown in Tables 2 and 3 and FIG. 7

TABLE 3

| | | | Example 7 | Example 8 | Example 9 | Example 10 | Example 11 | Example 12 | Example 13 | Example 14 |
|---|---|---|---|---|---|---|---|---|---|---|
| Composition of paste for forming elastic conductor | Elastomer | G8001 | | | | | | | | |
| | | G801 | 19.6 | | | | | | | |
| | | G802 | | 19.6 | | | | | | |
| | | G8002L | | | 19.6 | | | | | |
| | | GBRX | | | | 19.6 | 20 | | | |
| | | Hydran C2000L | | | | | | 12.4 | | |
| | | Nipol 1042 | | | | | | | 9.8 | |
| | | AR12 | | | | | | | | 10.8 |
| | Conductive particles | Sigma-Aldrich Silver flakes | 58.8 | 58.8 | 58.8 | 58.8 | 60 | 52.6 | 54.1 | 53.5 |
| | Surfactant | S386 | 2 | 2 | 2 | 2 | | | | |
| | Organic solvent | 4-Methyl-2-pentanone | 19.6 | 19.6 | 19.6 | 19.6 | 20 | 35 | 36.1 | 35.7 |
| Composition of elastic conductor | Elastomer | G8001 | | | | | | | | |
| | | G801 | 24.4 | | | | | | | |
| | | G802 | | 24.4 | | | | | | |
| | | G8002L | | | 24.4 | | | | | |
| | | GBRX | | | | 24.4 | 25 | | | |
| | | N504 | | | | | | | | |
| | | Hydran C2000L | | | | | | 19.1 | | |
| | | Nipol 1042 | | | | | | | 15.3 | |
| | | AR12 | | | | | | | | 16.8 |
| | Conductive particles | Sigma-Aldrich Silver flakes | 73.2 | 73.2 | 73.2 | 73.2 | 75 | 80.9 | 84.7 | 83.2 |
| | Surfactant | S386 | 2.4 | 2.4 | 2.4 | 2.4 | | | | |
| SEM observation | Presence of silver nanoparticles (Nanoparticle occupancy rate (%)) | | Many (6.5%) | Many | Many | Many | Few | Few | Few | Few |
| Elastic conductor evaluation | Elongation rate 0% | Conductivity (S/cm) | 74.9 | 260.3 | 343.2 | 1119 | 14.1 | 2154 | 1999 | 280 |
| | Elongation rate 50% | Conductivity (S/cm) | 726.5 | 1428 | 1078 | 656 | 398.2 | 933.6 | 465.9 | 238 |
| | | Stretch failure evaluation | Yes | Yes | Yes | Yes | Yes | Yes | Yes | Yes |
| | Elongation rate 100% | Conductivity (S/cm) | 688.7 | 1281 | 1139 | 599.9 | 480.8 | 707.5 | 213.3 | 225 |
| | | Stretch failure evaluation | Yes | Yes | Yes | Yes | Yes | Yes | Yes | Yes |
| | Elongation rate 150% | Conductivity (S/cm) | 474.8 | 850.4 | 1072 | 544.1 | 493.22 | 555.4 | 109.9 | 209 |
| | | Stretch failure evaluation | Yes | Yes | Yes | Yes | Yes | Yes | Yes | Yes |
| | Elongation rate 200% | Conductivity (S/cm) | 274 | 466.2 | 1010 | 498.3 | 501.6 | 400.6 | 27.4 | 176 |
| | | Stretch failure evaluation | Yes | Yes | Yes | Yes | Yes | Yes | Yes | Yes |
| | Elongation rate 250% | Conductivity (S/cm) | | | 970.8 | 463.3 | 510.4 | 112.2 | 2.3 | 55 |
| | | Stretch failure evaluation | No | No | Yes | Yes | Yes | Yes | Yes | Yes |
| | Elongation rate 300% | Conductivity (S/cm) | | | 823.6 | 431.9 | 371.84 | 8.6 | | 0.001 |
| | | Stretch failure evaluation | No | No | Yes | Yes | Yes | Yes | No | Yes |

Examples 15 to 21

Pastes for forming an elastic conductor were prepared by using the same elastomer and conductive particles as used in Example 1 and using surfactants shown in Table 4. Test pieces of elastic conductors were prepared by using the pastes in the same manner as in Example 1. As each surfactant, instead of S386 in Example 1, Zonyl FS-300 (trade name of DuPont), FC4430 (trade names of 3M) or FC4432 (trade names of 3M) was used as a fluorosurfactant; and, TRITON-X100 (available from Sigma-Aldrich), TDS-30, TDS-70, or TDS-120 (trade names of Dai-ichi Kogyo Seiyaku Co., Ltd.) was used as a non-ionic surfactant.

Figure 8:
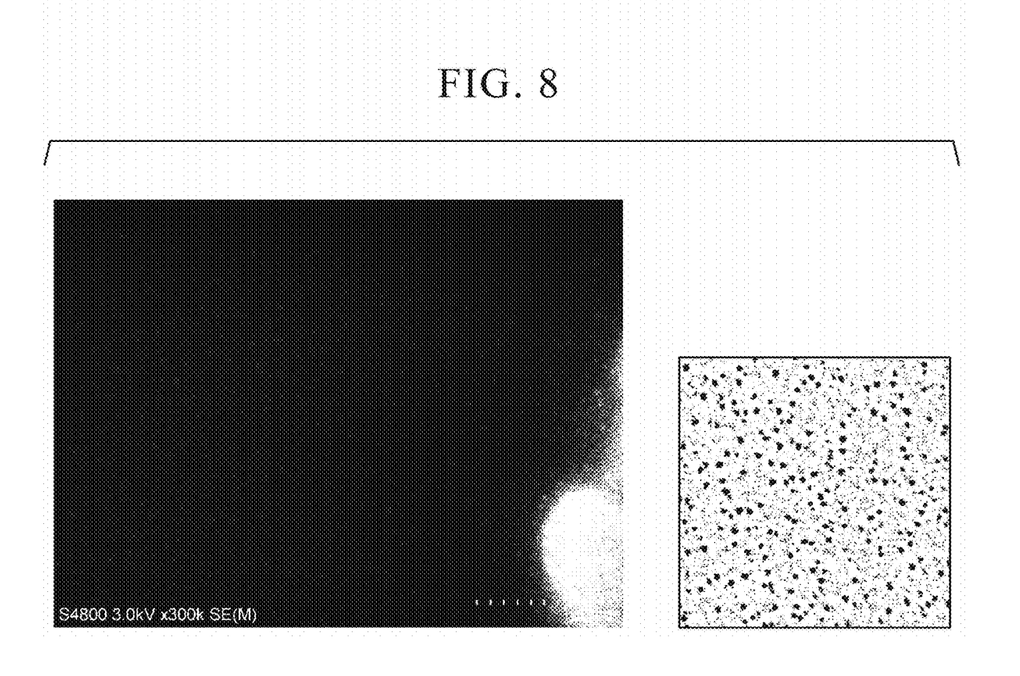
FIG. 8 is a scanning electron micrograph (left) and a view after image processing (right) of the elastic conductor sample obtained in Example 17.

The results of evaluating those test pieces in the same manner as in Example 1 are shown in Tables 2 and 4 and FIG. 8.

TABLE 4

| | | | Example 15 | Example 16 | Example 17 | Example 18 | Example 19 | Example 20 | Example 21 |
|---|---|---|---|---|---|---|---|---|---|
| Composition of paste for forming elastic conductor | Elastomer | G8001 | 19.6 | 19.6 | 19.6 | 19.6 | 19.7 | 19.6 | 19.6 |
| | Conductive particles | Sigma-Aldrich Silver flakes | 58.8 | 58.8 | 58.8 | 58.8 | 58.9 | 59 | 59 |
| | Surfactant | FS 300 (dehydrated) | 2 | | | | | | |
| | | FC4430 | | 2 | | | | | |
| | | FC4432 | | | 2 | | | | |
| | | TRITON-X100 | | | | 2 | | | |
| | | TDS-30 | | | | | 1.7 | | |
| | | TDS-70 | | | | | | 1.8 | |
| | | TDS-120 | | | | | | | 1.8 |
| | Organic solvent | 4-Methyl-2-pentanone | 19.6 | 19.6 | 19.6 | 19.6 | 19.7 | 19.6 | 19.6 |
| Composition of elastic conductor | Elastomer | G8001 | 24.4 | 24.4 | 24.4 | 24.4 | 24.5 | 24.5 | 24.5 |
| | Conductive particles | Sigma-Aldrich Silver flakes | 73.2 | 73.2 | 73.2 | 73.2 | 73.4 | 73.3 | 73.3 |
| | Surfactant | FS 300 (dehydrated) | 2.4 | | | | | | |
| | | FC4430 | | 2.4 | | | | | |
| | | FC4432 | | | 2.4 | | | | |
| | | TRITON-X100 | | | | 2.4 | | | |
| | | TDS-30 | | | | | 2.1 | | |
| | | TDS-70 | | | | | | 2.2 | |
| | | TDS-120 | | | | | | | 2.2 |
| SEM observation | Presence of silver nanoparticles (Nanoparticle occupancy rate (%)) | | Many | Many | Many (6.4%) | Few | Few | Few | Many |
| Elastic conductor evaluation | Elongation rate 0% | Conductivity (S/cm) | 3888 | 4960 | 4611 | 4072 | 3303 | 3606 | 4373 |
| | Elongation rate 50% | Conductivity (S/cm) | 1277 | 116.1 | 405.93 | 1660 | 1787 | 1861 | 1832.3 |
| | | Stretch failure evaluation | Yes | Yes | Yes | Yes | Yes | Yes | Yes |
| | Elongation rate 100% | Conductivity (S/cm) | 989.34 | | 1.54 | 1214.6 | 1287 | | 1263 |
| | | Stretch failure evaluation | Yes | No | Yes | Yes | Yes | No | Yes |
| | Elongation rate 150% | Conductivity (S/cm) | 782.83 | | | 969.33 | 739.9 | | |
| | | Stretch failure evaluation | Yes | No | No | Yes | Yes | No | No |
| | Elongation rate 200% | Conductivity (S/cm) | 499.85 | | | 764.36 | | | |
| | | Stretch failure evaluation | Yes | No | No | Yes | No | No | No |
| | Elongation rate 250% | Conductivity (S/cm) | | | | | | | |
| | | Stretch failure evaluation | No | No | No | No | No | No | No |
| | Elongation rate 300% | Conductivity (S/cm) | | | | | | | |
| | | Stretch failure evaluation | No | No | No | No | No | No | No |

Example 22

A paste for forming an elastic conductor was prepared by using the same elastomer, conductive particles and surfactant as used in Example 1 and using an organic solvent shown in Table 5. A test piece of an elastic conductor was produced by using the obtained paste for forming an elastic conductor in the same manner as in Example 1.

The result of evaluating the test piece in the same manner as in Example 1 is shown in Table 5.

Figure 9:
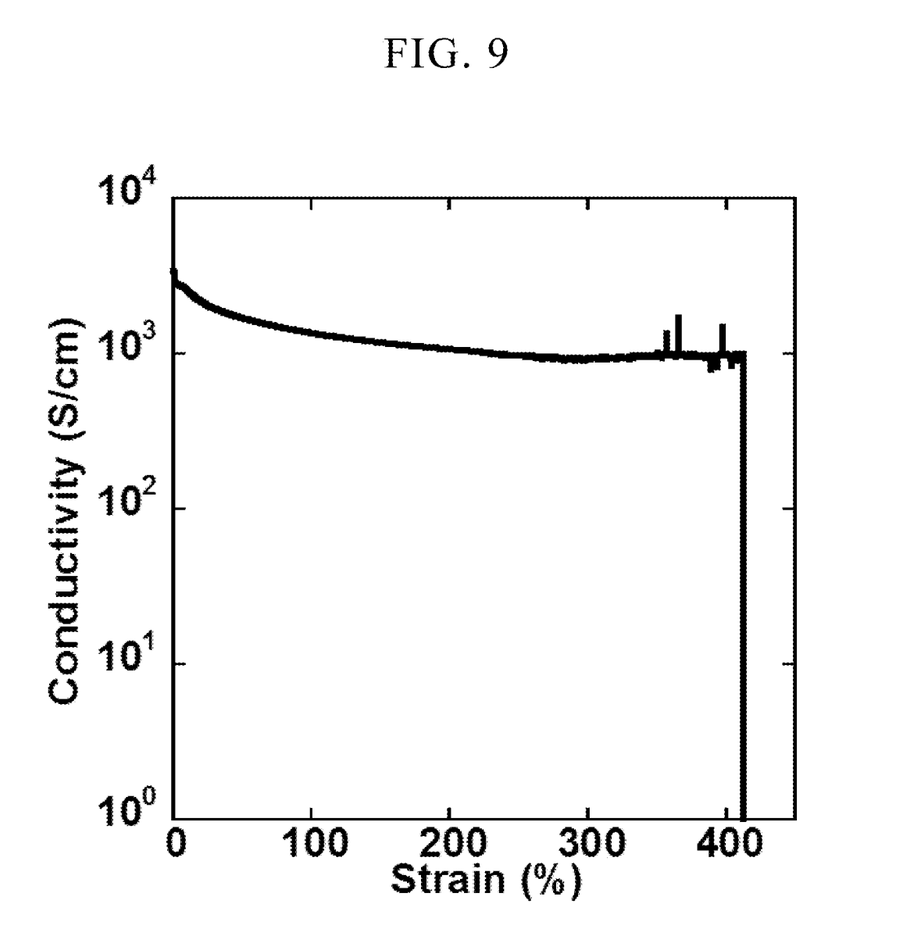
FIG. 9 is a view showing a relationship between strain amount and resistance in an elastic conductor sample obtained in Example 23.

450%) was measured in the same manner as in Example 1 except that the sample was fixed and evaluated such that the distance of the four terminal electrodes for evaluation was initially 30 mm. The results are shown in FIG. 9.

Comparative Examples 1 to 5

Pastes for forming an elastic conductors were prepared by using the same elastomer and surfactant as used in Example 1 and using conductive particles shown in Table 5. Test

TABLE 5

| | | | Example 22 | Comp. Example 1 | Comp. Example 2 | Comp. Example 3 | Comp. Example 4 | Comp. Example 5 | Comp. Example 6 |
|---|---|---|---|---|---|---|---|---|---|
| Composition of paste for forming elastic conductor | Elastomer | G8001 | 19 | 19.6 | 19.6 | 20 | 19.6 | 20 | |
| | | G801 | | | | | | | 19.9 |
| | Conductive particles | Sigma-Aldrich Silver flakes | 57.1 | | | | | | 42.9 |
| | | Shoei Chemical Ag-202 | | 58.8 | | | | | |
| | | Mitsui Kinzoku Q08S-2 | | | 58.8 | 60 | | | |
| | | Mitsui Kinzoku MD40A | | | | | 58.8 | 60 | |
| | Surfactant | S386 | 1.9 | 2 | 2 | | 2 | | |
| | | TRITON-X100 | | | | | | | 5.7 |
| | Organic solvent | 4-Methyl-2-pentanone | | 19.6 | 19.6 | 20 | 19.6 | 20 | 28.6 |
| | | Isophorone | 22 | | | | | | |
| | | water | | | | | | | 8.6 |
| Composition of elastic conductor | Elastomer | G8001 | 24.4 | 24.4 | 24.4 | twenty five | 24.4 | twenty five | |
| | | G801 | | | | | | | 22.7 |
| | Conductive particles | Sigma-Aldrich Silver flakes | 73.2 | | | | | | 68.2 |
| | | Shoei Chemical Ag-202 | | 73.2 | | | | | |
| | | Mitsui Kinzoku Q08S-2 | | | 73.2 | 75 | | | |
| | | Mitsui Kinzoku MD40A | | | | | 73.2 | 75 | |
| | Surfactant | S386 | 2.4 | 2.4 | 2.4 | | 2.4 | | |
| | | FS 300 (dehydrated) | | | | | | | 9.1 |
| SEM observation | Presence of silver nanoparticles (Nanoparticle occupancy rate (%)) | | Many | Medium | Many | Medium | Medium | Few | Nothing |
| Elastic conductor evaluation | Elongation rate 0% | Conductivity (S/cm) | 7471 | Without Conductivity | 51.8 | 0.5 | 56.8 | 392.7 | 700 |
| | Elongation rate 50% | Conductivity (S/cm) | 1736 | | 11.4 | 0.0002 | 447 | 26.8 | 500 |
| | | Stretch failure evaluation | Yes | | Yes | Yes | Yes | Yes | Yes |
| | Elongation rate 100% | Conductivity (S/cm) | 1174 | | 5.5 | 0.0006 | 362.7 | | 400 |
| | | Stretch failure evaluation | Yes | | Yes | Yes | Yes | No | Yes |
| | Elongation rate 150% | Conductivity (S/cm) | 917 | | 3.2 | 0.0002 | 294.8 | | 300 |
| | | Stretch failure evaluation | Yes | | Yes | Yes | Yes | No | Yes |
| | Elongation rate 200% | Conductivity (S/cm) | 753 | | 0.0009 | 0.0005 | | | 200 |
| | | Stretch failure evaluation | Yes | | Yes | Yes | No | No | Yes |
| | Elongation rate 250% | Conductivity (S/cm) | 444 | | | 0.0007 | | | |
| | | Stretch failure evaluation | Yes | | No | Yes | No | No | No |
| | Elongation rate 300% | Conductivity (S/cm) | 527 | | | 0.0008 | | | |
| | | Stretch failure evaluation | Yes | | No | Yes | No | No | No |

Example 23

A paste for forming an elastic conductor was prepared in the same manner as in Example 1. A test piece of an elastic conductor was produced in the same manner as in Example 1 except that the paste was used to print a pattern with 0.5 mm wide and 35 mm long on 20 μm thick polyurethane (5 mm wide and 35 mm long) without any pattern using stencil printing by using a polyimide shadow mask with 125 μm thickness. The conductivity at each strain (elongation 0% to pieces of elastic conductors were prepared by using the obtained pastes in the same manner as in Example 1. As the silver powders used, AG-202 (made by Shoei Chemical Industry Co., Ltd.) which was spherical powder, Q08S-2 and MD40A (made by Mitsui Metal Mining Co., Ltd.) which were circular silver powder were used in place of the silver flake (made by Sigma Aldrich company) of Example 1. Each paste for forming an elastic conductor was prepared using any one of the above silver powders, and each test piece of the elastic conductors was prepared in the same manner as in Example 1.

The results of evaluation of those test pieces in the same manner as in Example 1 are shown in Table 5.

Comparative Example 6

With respect to total amount of 100 parts by mass, 19.9 parts by mass of a fluororubber (G801: trade name of Daikin Industries, Ltd.) used as a raw material, 8.6 parts by mass of water, 28.6 parts by mass of 4-methyl-2-pentanone and 42.9 parts by mass of silver flakes having an average particle diameter of 10 µm or less ("silver flakes" manufactured by Sigma Aldrich, product number 327077-50G) were mixed. The mixture was stirred and mixed by a magnetic stirrer for 12 hours to obtain an ink mixture. The ink mixture was mixed with 5.7 parts by mass of a non-ionic surfactant TRITON-X 100 (obtained from Sigma-Aldrich) by stirring with a magnetic stirrer for 12 hours to obtain a paste for forming an elastic conductor. A test piece of an elastic conductor was produced in the same manner as in Example 1 by using the obtained paste.

Those test specimens were evaluated in the same manner as in Example 1, and the evaluation results are shown in Table 5.

REFERENCE NUMBER IN DRAWINGS

10 . . . Elastic conductor,
11 . . . Silver nanoparticles (nanoparticle conductive particles),
12 . . . Silver flake particles (flake-like conductive particles),
20 . . . Stretchable resin film,
21 . . . Elastic conductor,
22 . . . Rectangular scaffold piece.

The invention claimed is:

1. An elastic conductor comprising:
an elastomer,
two types of conductive particles, and
a surfactant,
wherein the two types of conductive particles are flake-like metallic particles having a particle diameter of 0.2 to 50 µm and metallic nanoparticles having a particle diameter of 0.5 to 50 nm,
the nanoparticles are dispersed throughout the elastomer, and
a mass composition ratio of the surfactant in the elastic conductor is 0.1% to 10% by mass.

2. The elastic conductor according to claim 1,
wherein the two types of conductive particles are uniformly dispersed throughout the elastomer.

3. The elastic conductor according to claim 1,
wherein the elastomer is a fluororubber.

4. The elastic conductor according to claim 1,
wherein an aspect ratio (a ratio of a long axis to a thickness) of the flake-like particles is 2 to 100.

5. The elastic conductor according claim 1,
wherein a mass composition ratio of the elastomer is 10% to 50% by mass with respect to the elastic conductor, and
a mass composition ratio of the conductive particles is 50% to 90% by mass with respect to the elastic conductor.

6. A method of producing the elastic conductor according to claim 1,
the method comprising:
mixing and stirring the elastomer, the flake-like particles, an organic solvent and the surfactant.

7. The method for producing an elastic conductor according to claim 6,
wherein the two types of conductive particles are uniformly dispersed throughout the elastomer.

8. The method for producing an elastic conductor according to claim 6,
wherein an amount of water of the paste which is obtained at the step of mixing and stirring is 0.5% by mass or less.

9. The method for producing an elastic conductor according to claim 6,
wherein the metallic nanoparticles are derived from the metallic flake-like particles.

10. An elastic conductor comprising:
an elastomer,
two types of conductive particles, and
a surfactant,
wherein the two types of conductive particles are flake-like metallic particles having a particle diameter of 0.2 to 50 µm and metallic nanoparticles having a particle diameter of 0.5 to 50 nm,
the nanoparticles are dispersed throughout the elastomer, and
the surfactant is a fluorosurfactant.

11. An elastic conductor comprising:
an elastomer,
two types of conductive particles, and
a surfactant,
wherein the two types of conductive particles are flake-like metallic particles having a particle diameter of 0.2 to 50 µm and metallic nanoparticles having a particle diameter of 0.5 to 50 nm,
the nanoparticles are dispersed throughout the elastomer, and
the elastic conductor has an electrical conductivity of 200 S/cm or more at an elongation rate of 0%, and has an electrical conductivity of 100 S/cm or more at an elongation rate of 300%.

12. A paste for forming an elastic conductor, comprising:
an elastomer,
at least two types of conductive particles,
an organic solvent, and
a surfactant,
wherein the two types of conductive particles are flake-like metallic particles having a particle diameter of 0.2 to 50 µm and metallic nanoparticles having a particle diameter of 0.5 to 100 nm, and
a mass composition ratio of the surfactant in the elastic conductor is 0.1% to 10% by mass.

13. The paste for forming an elastic conductor according to claim 12,
wherein the elastomer is a fluororubber.

14. The paste for forming an elastic conductor according to claim 12,
wherein an aspect ratio (a ratio of a long axis to a thickness) of the flake-like particles is 2 to 100.

15. The paste for forming an elastic conductor according to claim 12,
wherein a mass composition ratio of the elastomer is 10% to 50% by mass with respect to the non-volatile component of the paste for forming an elastic conductor, and a mass composition ratio of the conductive particles is 50% to 90% by mass with respect to the non-volatile component of the paste for forming an elastic conductor.

16. An elastic conductor obtained by drying the paste for forming an elastic conductor according to claim 12.

17. The paste for forming an elastic conductor according to claim 12,
wherein an amount of water of the paste for forming elastic conductor is 0.5% by mass or less.

* * * * *